March 18, 1947.  W. J. SIX  2,417,665

PISTON EXPANDER

Filed May 31, 1945

INVENTOR.
WALTER J. SIX.
BY
Lockwood, Goldsmith & Galt
ATTORNEYS.

Patented Mar. 18, 1947

2,417,665

UNITED STATES PATENT OFFICE 2,417,665

PISTON EXPANDER

Walter J. Six, Indianapolis, Ind.

Application May 31, 1945, Serial No. 596,825

14 Claims. (Cl. 309—12)

This invention relates to an expander for a piston skirt adapted for use in the cylinders of internal combustion engines, compression engines, steam engines and the like, whereby the skirt may be expanded to take up wear and prevent slap in the cylinder.

The principal feature of the invention resides in the adjustability and interlocking of the expander in the skirt, such as to provide a controlled expansion action, whereby the skirt may be expanded to a predetermined oversize. This is accomplished by providing the expander with a pair of boss sections adapted to embrace and interlock with the piston bosses to provide an anchor for the expander, and with respect to which a pair of opposed resilient expanding sections are slidably adjustable into engagement with the side walls of the piston skirt to expand under spring tension. By controlling the relative positions of said sections through a micrometer adjustment, any desired expanding action on the piston walls may be developed, reference being had to my Letters Patent No. 2,034,005, granted March 17, 1936.

One feature of the invention resides in the provision of an adjusting head arranged to engage the opposed expanding sections and interlock with the boss sections to permit a controlled wedging action therebetween by the setting of a threaded nut on a threaded anchor stem, such as to provide a micrometer adjustment between the sections, as will be hereinafter more specifically set forth and described.

Another feature of the invention resides in the slidable interlocking connection between the sections, whereby they are retained in unitary relation while permitting them to be slidable relative to each other to a position for obtaining the desired expansion.

Thus, through such manipulation as above referred to, the expander is applicable to pistons of varying size and may be adjusted to expand the piston to a predetermined over size.

The full nature of the invention will be understood from the accompanying drawings and the following description and claims:

Figure 1:
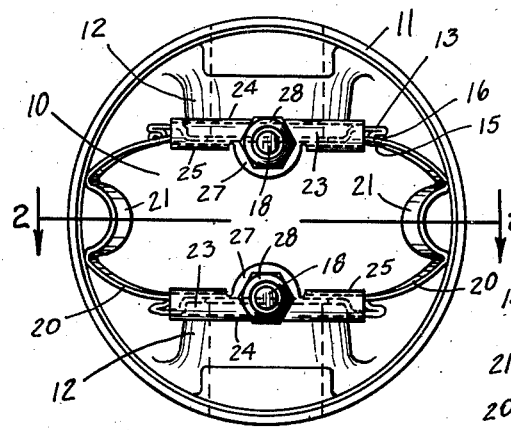
Fig. 1 is a bottom plan view of a piston showing an expander according to this invention mounted therein.

In the drawings there is shown a piston having a head portion 10 and a skirt portion 11 to be expanded. Extending inwardly from the skirt portion there are the usual opposed boss members 12. The expander, as hereinafter described, is adapted to be inserted into the skirt from the bottom open end thereof.

Figure 2:
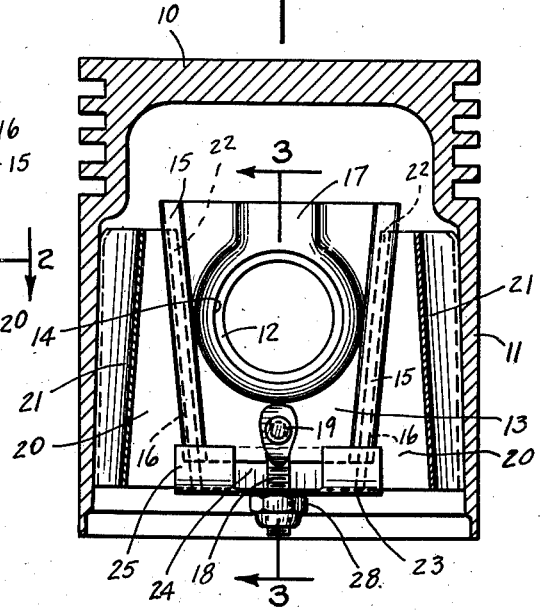
Fig. 2 is a section taken on the line 2—2 of Fig. 1.
Figure 3:
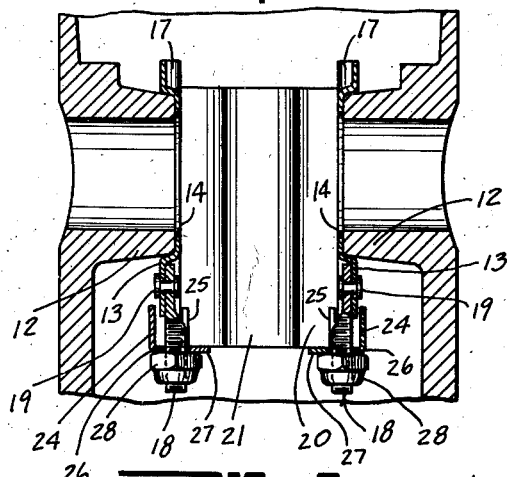
Fig. 3 is a section taken on the line 3—3 of Fig. 2.

The expander comprises a pair of boss locking sections 13. Each of said sections is provided with an annular flanged opening indicated at 14 adapted to surround the respective boss members to interlock with the side wall thereof adjacent the inner end. Thus, said boss locking sections, when the expander is mounted in the piston, are adapted to embrace and interlock with the side walls of the boss members 12. Each of said boss locking sections is tapered in general shape with its side edges extending at an angle, flaring outwardly from the bottom portion of the piston toward the head thereof, as shown in Fig. 2. Each side edge is rolled at 15 to provide a channel 16. On the upper end of the section when in place there is formed an inwardly dished lip 17 usable to guide the sections over the ends of the boss members when installing the expander in the piston. Anchored to the opposite end of each of the boss locking sections, the lower end when the expander is installed, there is a threaded anchor stem 18. Said stem is preferably pivotally anchored, such as by the rivet 19.

Slidably interlocked with each side of the boss locking sections 13 there is an expander section 20 having an expansion fold 21 formed longitudinally thereof intermediate its side sections. Said expander sections are bowed to extend into engagement with the inner side walls of the piston skirt intermediate the boss members, and are formed of spring metal, such as to yield under pressure. The side edges of each of said sections are rolled to form a bead 22 for interlocked sliding engagement in the channel 16 of the boss locking sections. Thus, the expander sections are slidable substantially longitudinally of and at an angle to the boss locking sections, and are interlocked therewith to provide an expander unit of general oval cross section. It will be noted, as in Figs. 1 and 2, that the expansion fold 21 is tapered, increasing in depth from the lower to the upper edge of the expander in its installed position. Thus, the skirt engaging portions along the expander sections are provided with a slight taper in conformity with the usual slight taper of the inner wall of the piston skirt.

Figure 4:
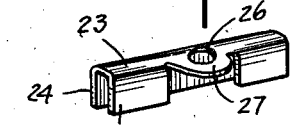
Fig. 4 is a perspective view of one of the adjusting heads.

For varying the overall size of the expander according to the size of the piston in which it is to be installed, and to control the yielding pressure exerted thereby for expanding the piston to the desired over size, there is provided an adjusting head 23 which is substantially U-shape in cross section, as shown in Fig. 4, having opposed flanges 24, 25. Said head is provided with an aperture 26 and an outwardly extending lip 27. The head is mounted over the anchor stem 18 which extends through the aperture 26 so that the flanges 24, 25 embrace the end of the boss locking section and the adjacent portion of the expander sections slidable therewith.

Figure 5:
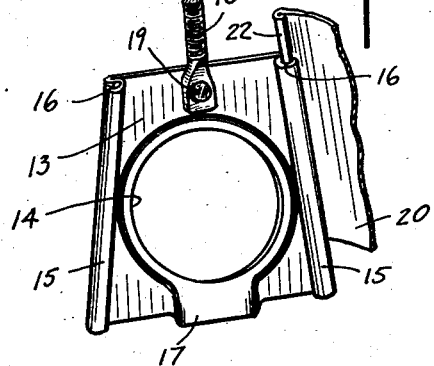
Fig. 5 is a perspective view of one of the boss locking sections showing a portion of one of the expanding sections slidably mounted thereon.
Figure 6:
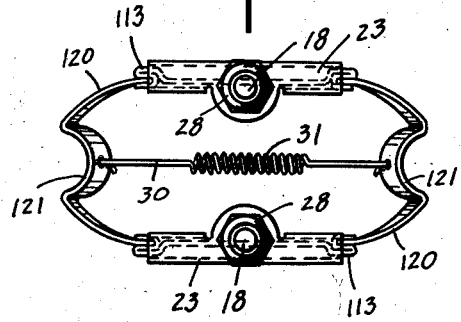
Fig. 6 is a view showing a fragmentary view of a modified form of the expander shown in Figs. 1–5.

In installation and adjustment to expand a piston to a predetermined oversize, the expander unit is inserted in the piston with the adjusting head removed or at its extreme position and the expander sections slid outwardly from the boss section somewhat in the manner shown by the fragmentary view of Fig. 5. In this position the expander is contracted sufficiently to permit the boss sections to be slid past and positioned about the bosses. Thereupon the expander sections are slid into engagement with the inner wall of the skirt and the adjusting head mounted over the stem for engagement with the upper ends of the expander sections. The nuts 28 are then screwed on the stem to force the adjusting head toward the boss sections, sliding the expander sections relative thereto. To the extent that the nut is screwed on the stem, the adjusting head will force the expanders under tension against the piston skirt by reason of their angularly disposed sliding engagement with the boss sections. Through adjustment of the nuts 28 the adjusting heads may thereby so position the expander sections as to bring them under a predetermined tension. In this manner, they may be adjusted and locked in position to expand a skirt of varying size within limits, and to bring such tension to a point that the skirt may be thereby expanded to a predetermined oversize. In such position the expander will be interlocked with the piston boss and expander sections held in their adjusted positions by the nuts 28.

Wherein it may be desired to employ a mere tongue and groove sliding engagement between the boss and expander sections, they may be held in unitary relation for convenience in handling and installation in the manner illustrated in Fig. 6. In this modification the edges of the boss sections 113 are formed with channels in which the adjacent edges of the expander sections 120 slidably fit. To hold them in place, instead of providing the interlocking channels as above described, the wire retainer 30 is hooked at its opposite ends into the expansion folds 121 of the expander sections. To permit the expander sections to be cammed outwardly as they are caused to slide relative to the boss locking sections, said retainer is provided intermediate its ends with an expansible portion 31.

The invention claimed is:

1. A piston expander adapted to be installed within a piston skirt having inwardly extending wrist pin bosses, said expander including opposed boss engaging sections, opposed end expander sections slidably carried by said boss sections at an angle for wedging engagement with the skirt intermediate said bosses, and interlocking means for said sections adjustable to wedge said expander sections against said skirt under predetermined tension.

2. A piston expander adapted to be installed within a piston skirt having oppositely disposed boss members, said expander including a U-shaped expander section of spring metal having inwardly extending wings terminating in angularly disposed edges, said edges slidably engaging with said boss members to slide relative thereto into wedging engagement with said skirt intermediate said boss members, and interlocking means engageable with said boss members and expander section adjustable to wedge said section against said skirt under predetermined tension.

3. A piston expander adapted to be installed within a piston skirt having oppositely disposed boss members, said expander including a pair of opposed U-shaped expander sections of spring metal having inwardly extending wings terminating in angularly disposed edges, said edges of each expander section slidably engaging with opposite sides of said boss members to slide relative thereto into wedging engagement with said skirt, and an interlocking member engageable with each of said boss members and opposed expander sections adjustable to wedge said sections against said skirt under predetermined tension.

4. A piston expander adapted to be installed within a piston skirt having oppositely disposed boss members, said expander including a pair of opposed U-shaped expander sections of spring metal having inwardly extending wings terminating in angularly disposed edges, said edges of each expander section slidably engaging with opposed sides of said boss members to slide relative thereto into wedging engagement with said skirt, a pair of adjusting heads, each engageable with the adjacent wings of the opposed expander sections, and means connected with said boss members for drawing the respective adjusting heads thereto for forcing said expander sections into wedging relation with said skirt under predetermined tension.

5. A piston expander adapted to be installed within a piston skirt having oppositely disposed boss members comprising a pair of opposed U-shaped expander sections of spring metal having inwardly extending wings terminating in angularly disposed edges slidably engaging with said boss members to slide relative thereto into wedging engagement with said skirt, an anchor stem secured to each of said boss members, an adjusting head carried by each of said anchor stems, said head spanning said boss members to engage adjacent ends of said wings, and means threaded on said stem for drawing said anchor head thereto and slidably forcing said expander sections into wedging engagement with said skirt under predetermined tension.

6. A piston expander adapted to be installed within a piston skirt having inwardly extending wrist pin bosses, said expander including opposed boss engaging sections formed to embrace and be anchored to said bosses, a pair of oppositely disposed U-shaped expander sections of spring metal having inwardly extending wings, the inner edges of said wings being in abutting sliding engagement with the adjacent edges of said boss engaging sections, such engaging edges flaring outwardly toward the head of the piston at an angle to the axis thereof, an anchor stem secured to said boss engaging sections respectively, and an adjusting head adjustable on each of said anchor stems extending into engagement with the ends of said expander sections to slidably adjust them relative to said boss sections and piston skirt into wedging engagement with the latter under predetermined tension.

7. A piston expander adapted to be installed within a piston skirt having inwardly extending wrist pin bosses, said expander including a pair of opposed U-shaped expander sections of spring metal having inwardly extending wings terminating in angularly disposed edges, each of said expander sections extending into engagement with said piston skirt intermediate said bosses, a threaded stem anchored to each of said bosses, an adjusting head carried by said stem extending into engagement with the adjacent ends of said expander sections, and means for displacing said head relative to said stem to force said expander sections between said bosses and skirt under tension to exert a predetermined expanding force thereagainst.

8. A piston expander adapted to be installed within a piston skirt having inwardly extending wrist pin bosses, said expander including a pair of opposed U-shaped expander sections of spring metal having inwardly extending wings terminating in angularly disposed edges, each of said expander sections extending into engagement with said piston skirt intermediate said bosses, said expander sections having their edges biased for sliding at an angle relative to said bosses, a threaded stem anchored to said bosses respectively, an adjusting head extending over each of said stems and into engagement with the ends of said expander sections, and a nut carried by said stem to engage said head for causing it to wedge said sections between said bosses and skirt under predetermined tension.

9. A piston expander adapted to be installed within said piston skirt having inwardly extending wrist pin bosses, said expander including opposed boss embracing sections provided with angularly disposed grooved edges, a pair of opposed U-shaped expander sections of spring metal having inwardly extending wings terminating in angularly disposed edges slidable in said grooves to wedging engagement with said skirt, an adjusting head carried by each of said boss sections engageable with the ends of said expander sections, and means for adjustably displacing said head and expander sections relative to said boss sections to wedge said expanding sections against said skirt under predetermined tension.

10. A piston expander adapted to be installed within said piston skirt having inwardly extending wrist pin bosses, said expander including opposed boss embracing sections provided with angularly disposed grooved edges, a pair of opposed U-shaped expander sections of spring metal having inwardly extending wings terminating in angularly disposed edges slidable in said grooves to wedging engagement with said skirt, a threaded stem anchored to each of said boss sections, an adjusting head carried by each of said stems extending into engagement with the adjacent ends of said expander sections, and a nut threaded on each of said stems for forcing said head thereon and thereby slide said expander sections into wedging engagement with said skirt under predetermined tension.

11. A piston expander adapted to be installed within said piston skirt having inwardly extending wrist pin bosses, said expander including opposed boss embracing sections provided with angularly disposed grooved edges, a pair of opposed U-shaped expander sections of spring metal having inwardly extending wings terminating in angularly disposed edges slidable in said grooves to wedging engagement with said skirt, an adjusting head carried by each of said boss sections engageable with the ends of said expander sections, means for adjustably displacing said head and expander sections relative to said boss sections to wedge said expanding sections against said skirt under predetermined tension, and a yielding cross bar anchored at opposite ends to the opposed expander sections for holding them in unitary relation with each other and said boss sections while permitting them to spread during their displacement into wedging engagement.

12. A piston expander adapted to be installed within said piston skirt having inwardly extending wrist pin bosses, said expander including opposed boss embracing sections provided with angularly disposed grooved edges, a pair of opposed U-shaped expander sections of spring metal having inwardly extending wings terminating in angularly disposed edges slidable in said grooves to wedging engagement with said skirt, a threaded stem anchored to each of said boss sections, an adjusting head carried by each of said stems extending into engagement with the adjacent ends of said expander sections, a nut threaded on each of said stems for forcing said head thereon and thereby slide said expander sections into wedging engagement with said skirt under predetermined tension, and yielding means for retaining said sections together as a unit while permitting spreading action thereof into wedging engagement with said skirt.

13. A piston expander adapted to be installed within a piston skirt having inwardly extending wrist pin bosses, said expander including opposed boss engaging sections of sheet metal having a flanged aperture formed to embrace and interlock with each of said bosses and provided with angularly disposed opposed edges rolled to form a channel, a pair of opposed U-shaped expander sections of spring metal having inwardly extending wings terminating in beaded edges slidably interlocked within said channels whereby said sections will be retained together as a unit to form a unitary expander of a generally oval shape, said interlocking edges being so formed as to cause said sections to wedge against the walls of said piston under tension when slidably displaced relative to said boss sections, and means carried by said sections adjustable to effect said displacement to thereby place said expander sections under predetermined tension.

14. A piston expander adapted to be installed within a piston skirt having inwardly extending wrist pin bosses, said expander including opposed boss engaging sections of sheet metal having a flanged aperture formed to embrace and interlock with each of said bosses and provided with angularly disposed opposed edges rolled to form a channel, a pair of opposed U-shaped expander sections of spring metal having inwardly extending wings terminating in beaded edges slidably interlocked within said channels whereby said sections will be retained together as a unit to form a unitary expander of a generally oval shape, said interlocking edges being so formed as to cause said sections to wedge against the walls of said piston under tension when slidably displaced relative to said boss sections, a threaded stem anchored to said boss sections, an adjusting head carried thereby extending into engagement with said expander sections, and means for forcing said head relative to said stem to slide said expander sections into predetermined wedging relation relative thereto and to said skirt to exert a yielding expanding pressure thereagainst.

WALTER J. SIX.

REFERENCES CITED

The following references are of record in the file of this patent:

UNITED STATES PATENTS

| Number | Name | Date |
|---|---|---|
| 1,688,792 | Schoengarth | Oct. 23, 1928 |
| 2,034,005 | Six | Mar. 17, 1936 |